(Model.)

J. G. HUBBS.
BEE HIVE.

No. 315,505. Patented Apr. 14, 1885.

WITNESSES
F. L. Onrand
W. L. Harris

Joe G. Hubbs
INVENTOR
by C. A. Snow & Co.
Attorneys (Model.)

J. G. HUBBS.
BEE HIVE.

No. 315,505. Patented Apr. 14, 1885.

2 Sheets—Sheet 2.

WITNESSES
C. W. Dashiell
E. G. Siggers

J. G. Hubbs.
INVENTOR
By C. A. Snow & Co.
Attorneys

UNITED STATES PATENT OFFICE.

JOSEPH G. HUBBS, OF PERRYSVILLE, OHIO.

BEE-HIVE.

SPECIFICATION forming part of Letters Patent No. 315,505, dated April 14, 1885.

Application filed April 19, 1884. (Model.)

*To all whom it may concern:*

Be it known that I, JOSEPH G. HUBBS, a citizen of the United States, residing at Perrysville, in the county of Ashland and State of Ohio, have invented a new and useful Improvement in Bee-Hives, of which the following is a specification, reference being had to the accompanying drawings.

This invention has relation to bee-hives; and it has for its objects the protection of the bees from storms and cold weather, and from all kinds of insects; to provide proper ventilation without having a direct draft; to afford protection to the bee-keeper from the bees when taking honey from the hive, and to provide a hive that will possess superior advantages over the hives now in use; and to these ends it consists in the construction and novel arrangement of parts, as will be hereinafter fully described, and particularly pointed out in the claims.

Figure 1:
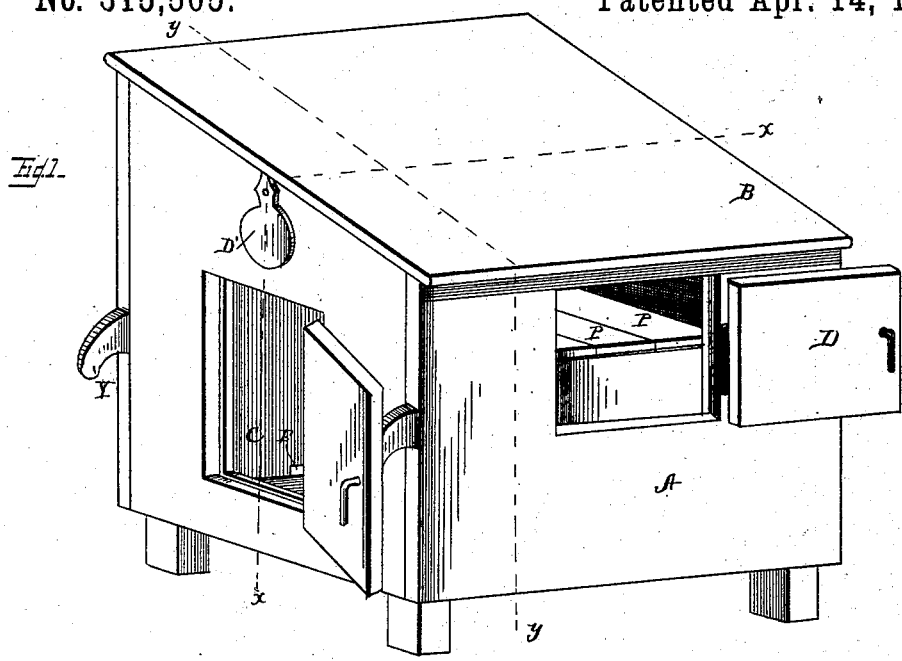
Figure 2:
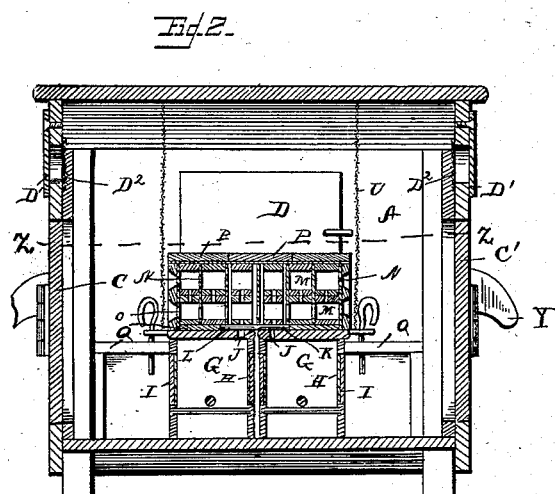
Figure 3:
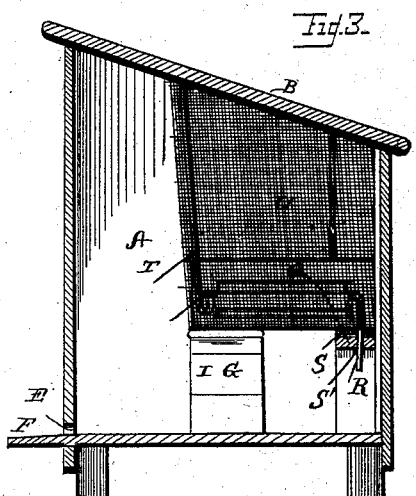
Figure 4:
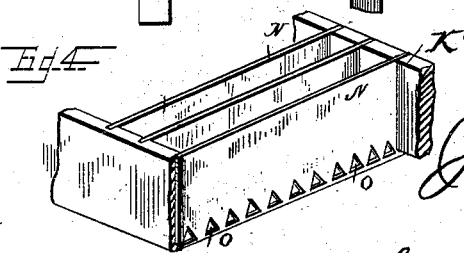
Figure 5:
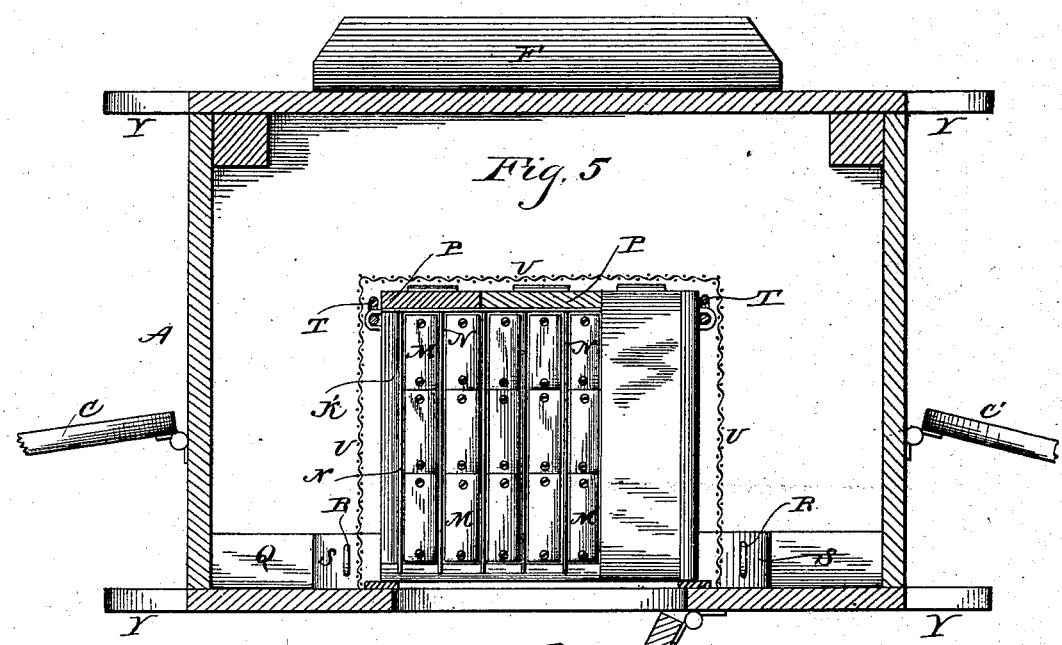
Figure 6:
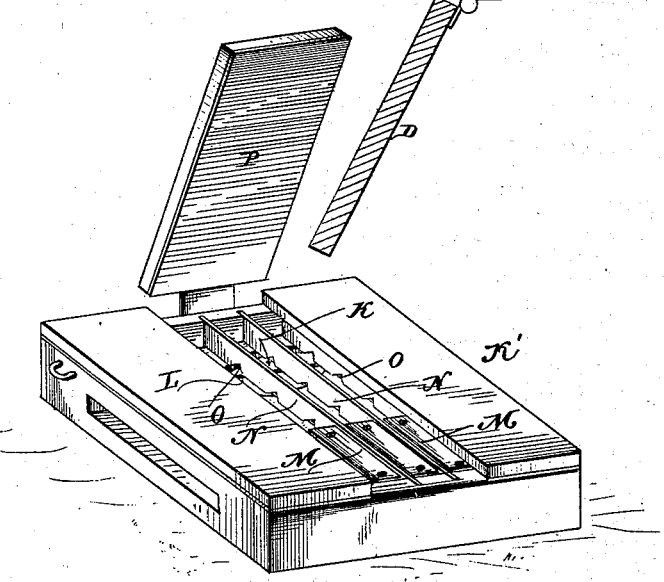
Figure 7:
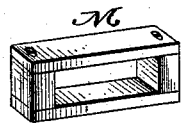

Figure 1 is a view in perspective of a bee-hive embodying my improvement. Fig. 2 is a transverse vertical sectional view on the line $xx$ in Fig. 1. Fig. 3 is a vertical longitudinal sectional view on the line $yy$ in Fig. 1; and Fig. 4 is a detail perspective view of the tin separating-slats. Fig. 5 is an enlarged horizontal section on the line $zz$, Fig. 2, two of the sections of the cover being raised to show the interior of the box with its comb-frames. Fig. 6 is a detachable perspective view of the comb-frame box. Fig. 7 is a detail view of one of the honey-boxes for the comb-frames.

Referring by letter to the accompanying drawings, A designates the bee-hive, which is built on suitable legs, and is about four and one-half feet long by four feet wide, and of proportionate height. The hive is provided with a slanting roof, B, and three doors, C, C', and D, the two former doors being at the ends of the palace, and the other at the rear of the same. Above the end doors, C C', are two ventilators or holes provided with pivoted doors D', and covered with wire screening D², secured to the inner faces of the end walls of the hive. E is the entrance to the hive, and F the alighting-board. The brood-chambers G G rest on the floor of the hive, near the middle of the same, and are provided with windows H, covered by sliding blinds I. Openings J in the top of the brood-chambers communicate with an opening, K, in the bottom of the comb-frame box, said opening K being spanned by a metal cross-rod, L, which supports the honey-boxes M, that come immediately over the opening K. The comb-frame box K' is made about ten inches deep, so that it will hold two tiers of honey-boxes, M. The honey-boxes are separated from each other by strips N, of tin, having notches O in their lower edges for the passage of the bees. The cover of the comb-frame box is made in sections, P, hinged at their inner ends to the edge of the box K', and lined on their under faces with tin, as the bees will not seal their combs to tin. I therefore use tin separators in the comb-frame box. The comb-frame box is movable, and is secured to a bench, Q, by eye-rods R, passed down through perforations in the projecting ends of a metal strip, S, secured to the bottom of the comb-frame box K', and through perforations S' in the bench, and is suspended from the roof of the hive by hook-rods T. The comb-frame box K' is surrounded on three sides by a wire screen, U, extending from its bottom to the roof, as shown. When it is desired to take the honey-boxes out of the comb-frame box, the bees are driven into the hive in front of the screen U, and the bee-keeper can then handle the honey-boxes from the rear door of the hive without danger of being stung by the bees. The hive is provided with handles Y, for convenience in moving it. The ventilation in this construction is perfect, it being indirect, thereby causing no direct draft through the hive. The tin separators compel the bees to deposit or build their combs in the wooden cells or honey-boxes M between them.

It will be seen that by reason of the comb-frame box K' coming on a line with the door D the latter, when opened, allows free access to said box; also, by having the cover of the box made in sections either section may be raised to expose a portion of the comb-box, from which the honey-boxes may be removed separately, as desired. The fitting of two or more honey-boxes between the tin strips allows the removal of each independent of the others.

Having thus fully described my invention, what I claim as new, and desire to secure by Letters Patent of the United States, is—

1. The combination, with the hive A, provided with the doors C, C', and D, of the brood-chambers G G, and the comb-frame box K', removably secured within the hive and surrounded on three sides by the wire screen U, extending from the bottom of the comb-frame box to the roof of the hive A, substantially as specified.

2. The combination, with the comb-frame box K', having a bottom opening provided with a cross-rod and a tin-lined cover, of the notched tin separating-slats and the honey-boxes, substantially as specified.

3. The combination, with frame A, the brood-chambers G G, and the bench Q, of the comb-frame box K', provided with a metal bottom strip having perforated projecting ends, the eye-rods securing the strip to the bench, the hook-rods suspending the opposite end of the comb-frame box from the roof, and the wire screen U, substantially as specified.

4. In a bee-hive, the combined frame-box comprising the tin separating-strips, two or more honey-boxes fitted together in the space inclosed by each two strips, and a hinged tin-lined cover made in sections, so that either one of the sections may be raised to permit the withdrawal of the boxes separately from the box, as set forth.

5. In a bee-hive, the combination, with the outer casing of the hive provided with a door, D, of the comb-frame box K', detachably suspended within the casing adjacent to and on a line with the door, and a wire screen, U, surrounding the comb-frame box on three sides, as and for the purpose set forth.

In testimony that I claim the foregoing as my own I have hereto affixed my signature in presence of two witnesses.

JOSEPH G. HUBBS.

Witnesses:
GEO. B. COULTER,
N. B. STRICKLER.